US008755796B2

(12) United States Patent
Aoyagi et al.

(10) Patent No.: US 8,755,796 B2
(45) Date of Patent: Jun. 17, 2014

(54) MOBILE COMMUNICATION SYSTEM THAT SELECTIVELY DETERMINES UPLINK TRANSMISSION TO A BASE STATION EVEN WHEN RADIO SIGNAL TRANSMISSION TO THE BASE STATION IS PROHIBITED

(75) Inventors: Kenichiro Aoyagi, Yokosuka (JP); Masafumi Masuda, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 572 days.

(21) Appl. No.: 12/995,018

(22) PCT Filed: May 29, 2009

(86) PCT No.: PCT/JP2009/059874
§ 371 (c)(1),
(2), (4) Date: Feb. 2, 2011

(87) PCT Pub. No.: WO2009/145301
PCT Pub. Date: Dec. 3, 2009

(65) Prior Publication Data
US 2011/0117884 A1   May 19, 2011

(30) Foreign Application Priority Data
May 29, 2008   (JP) .................. 2008-141757

(51) Int. Cl.
*H04Q 7/20*   (2006.01)
(52) U.S. Cl.
USPC ............ 455/435.1; 455/435.2; 455/411; 455/458; 455/414.1; 455/414.3; 370/328; 370/338; 370/230; 370/395.2
(58) Field of Classification Search
USPC ............ 455/411, 458, 452.1, 453, 435; 370/328, 389, 338, 230, 395.2
See application file for complete search history.

(56) References Cited

U.S. PATENT DOCUMENTS 5,815,808 A * 9/1998 Valentine .................. 455/422.1
2001/0005359 A1 * 6/2001 Bergqvist .................... 370/230
(Continued)

FOREIGN PATENT DOCUMENTS

JP   05 075536   3/1993
JP   10 505968   6/1998
(Continued)

OTHER PUBLICATIONS

Office Action issued Apr. 24, 2012, in Japanese Patent Application No. 2010-514553 (with English-language translation).
International Search Report issued Jul. 7, 2009 in PCT/JP09/059874 filed May 29, 2009.
Office Action issued Dec. 24, 2012 in Chinese Patent Application No. 200980119706.7 with English language translation.

*Primary Examiner* — Patrick Edouard
*Assistant Examiner* — Fred Casca
(74) *Attorney, Agent, or Firm* — Oblon, Spivak, McClelland, Maier & Neustadt, L.L.P.

(57) ABSTRACT

Provided is a mobile communication method including: a step in which a first radio base station #a transmits broadcast information containing transmission availability information indicating whether a radio signal can be transmitted; and a step which determines whether the radio signal can be transmitted according to the transmission availability information contained in the broadcast information and access information managed in a mobile station #X. The mobile station #X can transmit the radio signal to the first radio base station #a when an access to the first radio base station #a is permitted in the access information even if transmission of the radio signal to the first radio base station #a is restricted by the transmission availability information.

6 Claims, 7 Drawing Sheets

(56) References Cited

U.S. PATENT DOCUMENTS

2008/0032714 A1* 2/2008 Suzuki et al. ............... 455/458
2010/0074171 A1   3/2010 Noguchi et al.
2010/0173602 A1* 7/2010 Muramatsu ............. 455/556.1

FOREIGN PATENT DOCUMENTS

| JP | 2001 078249 | 3/2001 |
| JP | 2001-78260  | 3/2001 |
| JP | 2008-98951  | 4/2008 |

* cited by examiner

| RADIO BASE STATION ID | ACCESS-PERMITTED MOBILE STATION ID |
|---|---|
| #a | #X |
| #b | #Y |
| ⋮ | ⋮ |

| PRIORITY LEVEL | TRANSMISSION PERMISSION/PROHIBITION |
|---|---|
| 1 | × |
| 2 | × |
| 3 | × |

MOBILE COMMUNICATION SYSTEM THAT SELECTIVELY DETERMINES UPLINK TRANSMISSION TO A BASE STATION EVEN WHEN RADIO SIGNAL TRANSMISSION TO THE BASE STATION IS PROHIBITED

TECHNICAL FIELD

The present invention relates to a mobile communication method and a mobile station.

BACKGROUND ART

In a conventional mobile communication system, a radio base station which manages a particular cell can control transmission restriction of a radio signal (RACH signal, for example) from a mobile station, by transmitting broadcast information including transmission availability information.

Meanwhile, a home-cell-managing radio base station (Femto BTS) is configured to permit accesses only from a mobile station having an access permission (from a registered mobile station) and to refuse accesses from a mobile station having no access permission (from an unregistered mobile station).

DISCLOSURE OF THE INVENTION

Problem to be Solved by the Invention

However, the conventional mobile communication system has a problem that even the registered mobile station fails to access a home-cell-managing radio base station managing a particular home cell if the home-cell-managing radio base station transmits broadcast information including transmission availability information in which all the mobile stations are prohibited from transmitting radio signals.

In addition, the conventional mobile communication system is configured in such a manner that the determination as to whether or not a mobile station has an access permission to a home-cell-managing radio base station managing a particular home cell is made not by the home-cell-managing radio base station itself, but by a network apparatus (radio controller RNC, for example) which is an upper node of the home-cell-managing radio base station.

Specifically, if the home-cell-managing radio base station transmits broadcast information including transmission availability information which permits all the mobile stations to transmit radio signals, an unregistered mobile station transmits a radio signal, such as a location registration signal, to a network apparatus via the home-cell-managing radio base station. Then, the network apparatus determines acceptance or refusal of the radio signal on the basis of whether or not the unregistered mobile station has an access permission to the home-cell-managing radio base station.

This involves a problem that, in an area along a heavy traffic road, in a high-density residential area, or in any other similar area, processing load on a home-cell-managing radio base station may be increased excessively because unregistered mobile stations are likely to transmit a large number of radio signals for performing processing such as location registration processing or call processing.

The present invention has been made to address the above problem, and an objective thereof is to provide a mobile communication method and a mobile station which can make such a setting that inside a home cell under control of a home-cell-managing radio base station provided in an area along a heavy traffic road, in a high-density residential area, or in any other similar area, only an unregistered mobile station is prohibited from transmitting a radio signal, and thus can prevent an excessive increase in processing load on the home-cell-managing radio base station.

Means for Solving the Problem

A mobile communication method of a first aspect includes: step A of transmitting from a first radio base station broadcast information including transmission availability information indicating whether or not radio signal transmission to the first radio base station is permitted; and step B of determining at the mobile station whether or not radio signal transmission to the first radio base station is permitted on the basis of the transmission availability information included in the received broadcast information and of access information managed inside the mobile station. In the step B, the mobile station is permitted to transmit a radio signal to the first radio base station in a case where access to the first radio base station is permitted in the access information even if radio signal transmission to the first radio base station is prohibited in the transmission availability information.

In the first aspect, in the step A, the first radio base station transmits broadcast information including transmission availability information restricting radio signal transmission by all of mobile stations, radio signal transmission by all of priority levels of the mobile stations, or radio signal transmission for all of call types.

In the first aspect, the mobile communication method includes the steps of: transmitting a query signal by the mobile station irrespective of the transmission availability information included in the received broadcast information, the query signal inquiring access information for the mobile station to access the first radio base station; and acquiring access information by the first radio base station from a network apparatus in response to the query signal, and notifying the mobile station of the access information for the mobile station to access the first radio base station.

A mobile station of a second aspect includes: a broadcast information receiving unit configured to receive broadcast information from a first radio base station, the broadcast information including transmission availability information indicating whether or not radio signal transmission to the first radio base station is permitted; an access information managing unit configured to manage access information specifying a radio base station to which access is permitted; and a determining unit configured to determine whether or not radio signal transmission to the first radio base station is permitted on the basis of the transmission availability information included in the received broadcast information and of the access information managed by the access information managing unit. The determining unit is permitted to transmit a radio signal to the first radio base station in a case where access to the first radio base station is permitted in the access information even if radio signal transmission to the first radio base station is prohibited in the transmission availability information.

In the second aspect, the broadcast information includes outgoing call availability information restricting radio signal transmission by all of mobile stations, radio signal transmission by all of priority levels of the mobile stations, or radio signal transmission for all of call types.

In the second aspect, the mobile station includes an acquiring unit configured to acquire access information for the mobile station to access the first radio base station, by transmitting a query signal to the first radio base station irrespective of the transmission availability information included in the received broadcast information.

Effect of the Invention

As described above, according to the present invention, provided are a mobile communication method and a mobile station which can make such a setting that inside a home cell under control of a home-cell-managing radio base station provided in an area along a heavy traffic road, in a high-density residential area, or in any other similar area, only an unregistered mobile station is prohibited from transmitting a radio signal, and thus can prevent an excessive increase in processing load on the home-cell-managing radio base station.

EMBODIMENTS FOR CARRYING OUT THE INVENTION

Configuration of Mobile Communication System According to First Embodiment of the Present Invention Referring to FIG. 1 through FIG. 6, a configuration of a mobile communication system according to the first embodiment of the present invention will be described.

Figure 1:
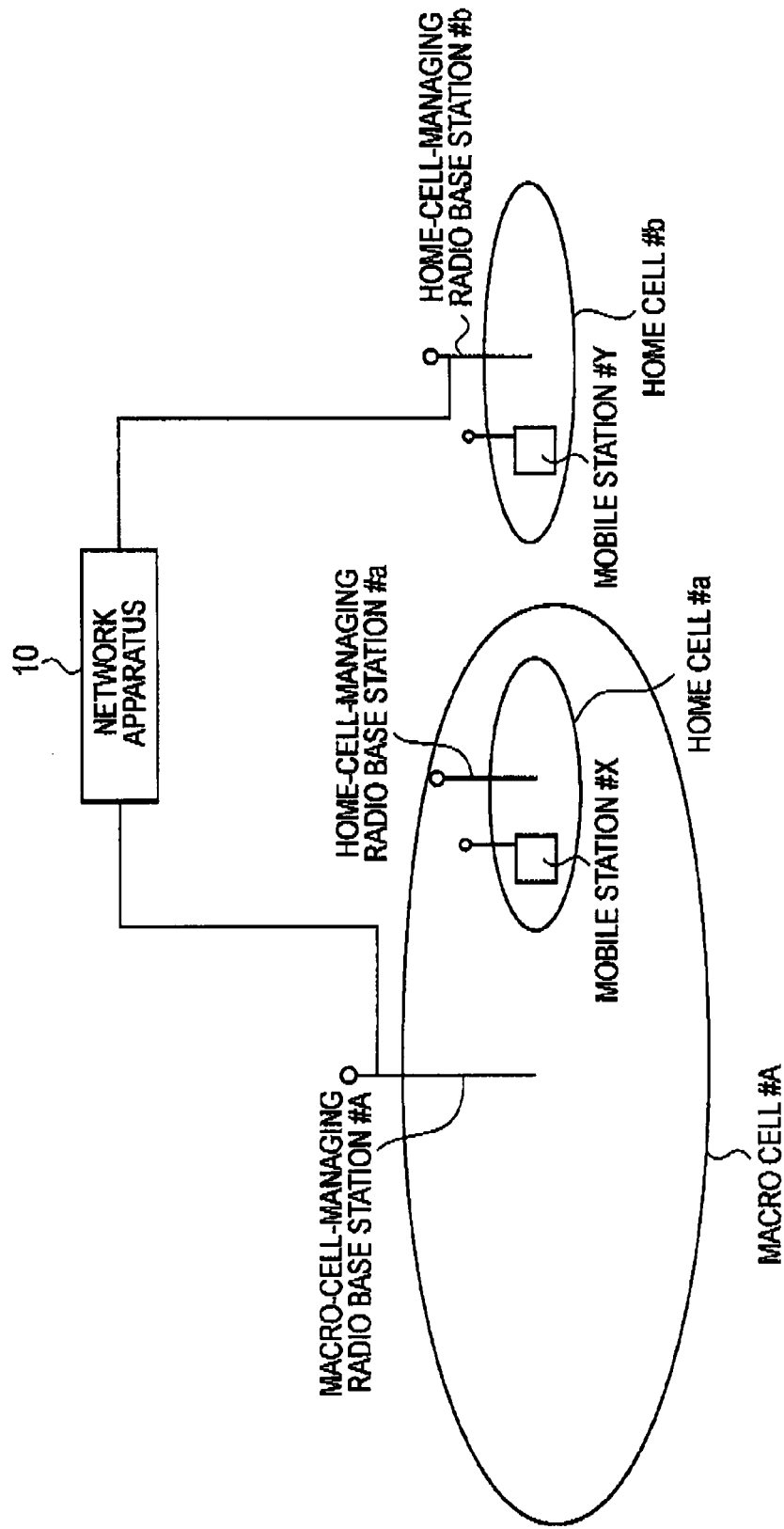
FIG. 1 is an entire configuration diagram of a mobile communication system according to a first embodiment of the present invention.

As shown in FIG. 1, the mobile communication system according to the embodiment includes: a network apparatus 10; a macro-cell-managing radio base station #A which manages a macro cell #A; a home-cell-managing radio base station #a which manages a home cell #a; and a home-cell-managing radio base station #b which manages a home cell #b.

In the example of FIG. 1, the home cell #a is located in a coverage area of the macro cell #A while the home cell #b is not located in the coverage area of the macro cell #A.

Figures 2, 3:
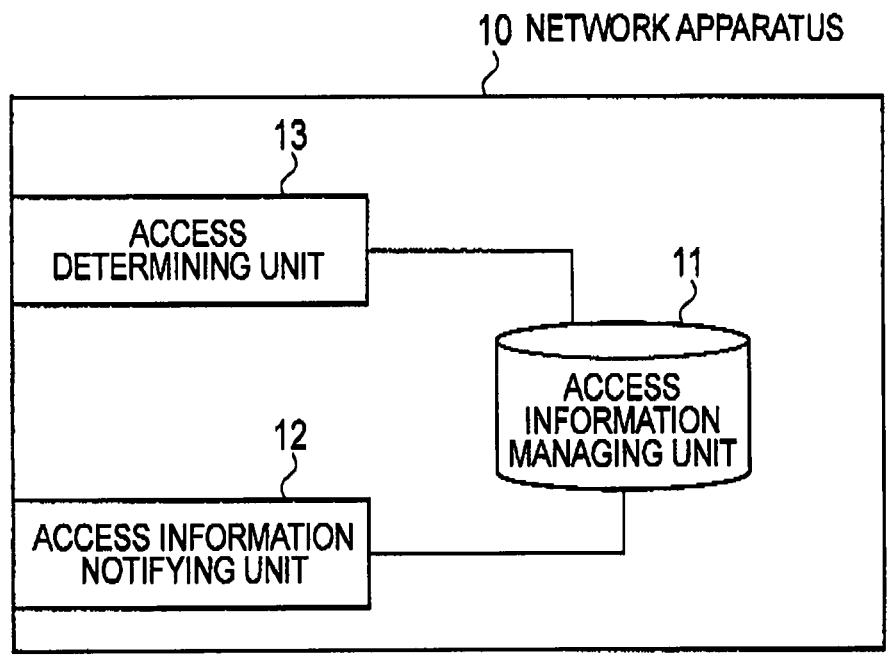
FIG. 2 is a functional block diagram of a network apparatus according to the first embodiment of the present invention.
FIG. 3 is a diagram showing an example of access information which is managed by the network apparatus according to the first embodiment of the present invention.

As shown in FIG. 2, a network apparatus 10 (radio controller RNC or a switching apparatus MSC/SGSN, for example) includes: an access information managing unit 11; an access information notifying unit 12; and an access determining unit 13.

The access information managing unit 11 is configured to manage access information which indicates whether or not a mobile station is permitted to access a radio base station (home-cell-managing radio base station).

For example, the access information managing unit 11 is configured to manage access information in which a "radio base station ID" and an "access-permitted mobile station ID" are associated to each other as shown in FIG. 3.

Here, the "access-permitted mobile station ID" is identification information for a mobile station which is permitted to access the radio base station (home-cell-managing radio base station) specified by the "radio base station ID."

The access information notifying unit 12 is configured to notify access information in response to a request from a home-cell-managing radio base station, the access information indicating whether or not a particular mobile station is permitted to access the home-cell-managing radio base station.

The access determining unit 13 is configured to determine whether or not a particular mobile station is permitted to access a home-cell-managing radio base station by referring to the access information managing unit 11 when having received a radio signal transmitted from the particular mobile station via the home-cell-managing radio base station.

Here, the access determining unit 13 is configured to accept the radio signal when having determined that the particular mobile station is permitted to access the home-cell-managing radio base station, and thus to perform predetermined processing.

On the other hand, the access determining unit 13 is configured to notify the particular mobile station via the home-cell-managing radio base station that acceptance of the radio signal is refused when having determined that the particular mobile station is not permitted to access the home-cell-managing radio base station.

Figures 4, 5:
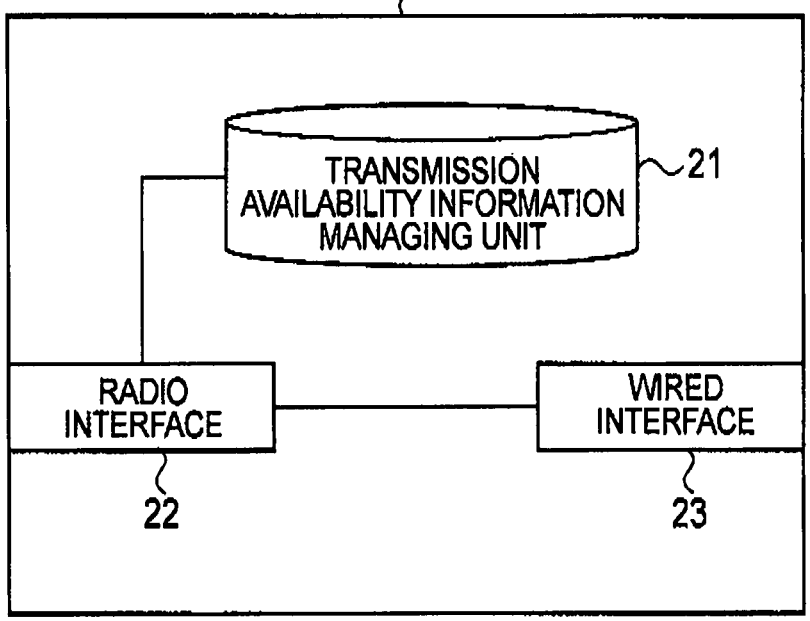
FIG. 4 is a functional block diagram of a home-cell-managing radio base station according to the first embodiment of the present invention.
FIG. 5 is a diagram showing an example of priority level information which is managed by the home-cell-managing radio base station according to the first embodiment of the present invention.

As shown in FIG. 4, the home-cell-managing radio base stations #a and #b each include: a transmission availability information managing unit 21; a radio interface 22; and a wired interface 23.

The transmission availability information managing unit 21 is configured to manage transmission availability information which indicates whether or not radio signal transmission to the home-cell-managing radio base stations #a and #b in the home cells #a and #b which are under control of the home-cell-managing radio base stations #a and #b is permitted.

For example, the transmission availability information managing unit 21 is configured to manage transmission availability information in which "priority level" and "transmission permission/prohibition" are associated to each other, as shown in FIG. 5.

In this respect, "priority level" indicates priority levels assigned to mobile stations while "transmission permission/prohibition" is information indicating whether or not the mobile stations which are assigned the priority levels specified by "priority level" are permitted to transmit radio signals to the home-cell-managing radio base stations #a and #b.

Note that, instead of managing information indicating whether or not a mobile station is permitted to transmit a radio signal to the home-cell-managing radio base stations #a and #b on the basis of the priority levels, the transmission availability information managing unit 21 may be configured to manage information indicating whether or not a mobile station is permitted to transmit a radio signal to the home-cell-managing radio base stations #a and #b for each mobile station or on the basis of types of call (an emergency call, a normal call, or the like).

The transmission availability information managing unit 21 may set the transmission availability information in such a way that the information restricting radio signal transmission by all the mobile stations, radio signal transmission by all the priority levels of the mobile stations, or radio signal transmission for all the call types.

The radio interface 22 is configured to transmit broadcast information including the above-mentioned transmission availability information in the home cells #a and #b which are under control of the home-cell-managing radio base stations #a and #b.

In addition, the radio interface 22 is configured to forward a signal transmitted from the mobile station, such as a location registration signal or a query signal, to the network apparatus 10 via the wired interface 23.

The wired interface 23 is configured to forward a signal transmitted from the network apparatus 10, such as a response signal to the location registration signal or a response signal to the query signal, to the mobile station via the radio interface 22.

Figure 6:
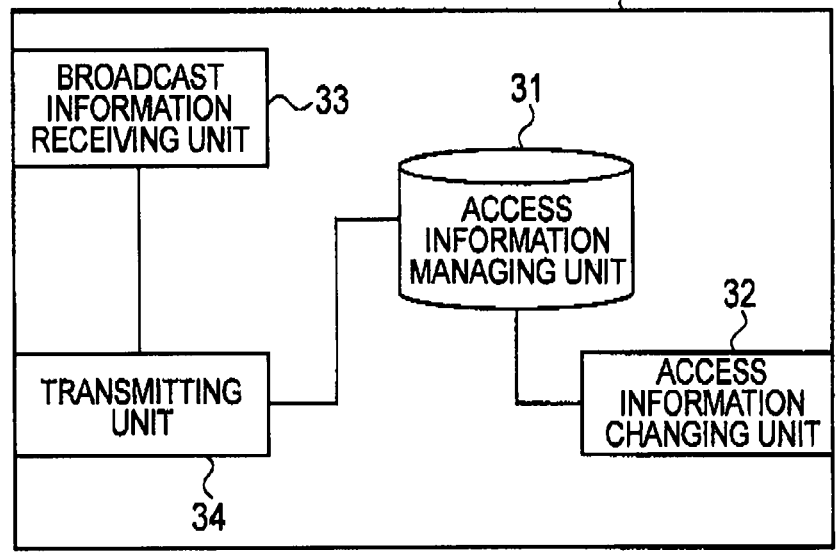
FIG. 6 is a functional block diagram of the network apparatus according to the first embodiment of the present invention.

As shown in FIG. 6, mobile stations #X and #Y each include: an access information managing unit 31; an access information changing unit 32; a broadcast information receiving unit 33; a transmitting unit 34.

The access information managing unit 31 is configured to manage access information which specifies a radio base station (home-cell-managing radio base station) which permits access from its own mobile station #X or #Y.

Note that the access information managing unit 31 may be provided in a USIM (Universal Subscriber Identification Module) mounted on its own mobile station #X or #Y.

The access information changing unit 32 is configured to change the access information managed by the access information managing unit 31.

For example, the access information changing unit 32 may be configured to change the access information managed by the access information managing unit 31 in accordance with access information transmitted from the network apparatus 10 in response to the query signal.

Instead, the access information changing unit 32 may be configured to change the access information managed by the access information managing unit 31 in accordance with a manual input of a distributor shop of a mobile communication carrier or the like or in accordance with a remote input of a mobile communication carrier.

The broadcast information receiving unit 33 is configured to receive broadcast information from the home-cell-managing radio base station (a first radio base station), the broadcast information including transmission availability information indicating whether or not radio signal transmission to the home-cell-managing radio base station is permitted.

The transmitting unit 34 is configured to determine whether or not radio signal transmission to the home-cell-managing radio base station is permitted, on the basis of the transmission availability information included in the broadcast information received by the broadcast information receiving unit 33 and of the access information managed by the access information managing unit 31.

Specifically, the transmitting unit 34 is permitted to transmit a radio signal to the home-cell-managing radio base station in a case where access to the home-cell-managing radio base station is permitted in the above-mentioned access information, even though radio signal transmission to the home-cell-managing radio base station is prohibited in the transmission availability information.

Specifically, the transmitting unit 34 is permitted to transmit a radio signal to the home-cell-managing radio base station in a case where access to the home-cell-managing radio base station is permitted in the above-mentioned access information, even though the broadcast information receiving unit 33 has received broadcast information including outgoing call availability information restricting radio signal transmission by all the mobile stations, radio signal transmission by all the priority levels of the mobile stations, or radio signal transmission for all the call types.

In addition, the transmitting unit 34 is configured to acquire access information, by transmitting a query signal to the home-cell-managing radio base station, irrespective of the transmission availability information included in the broadcast information received by the broadcast information receiving unit 33, the access information indicating whether the mobile station is permitted to access the home-cell-managing radio base station.

Note that, in a case where the access to the home-cell-managing radio base station is not permitted in the above-mentioned access information, the transmitting unit 34 determines whether or not radio signal transmission to the home-cell-managing radio base station is permitted, in accordance with a conventional prohibition, or specifically, in accordance with whether or not radio signal transmission to the home-cell-managing radio base station is prohibited in the above-mentioned transmission availability information.

For example, the transmitting unit 34 is permitted to transmit a radio signal to the home-cell-managing radio base station, even in a case where the access to the home-cell-managing radio base station is not permitted in the above-mentioned access information, in a case where the conventional prohibition has a setting of "prohibition by 50%" and thus the priority level of the mobile station is not the target of prohibition of radio signal transmission, or in a case where the mobile station is to make an emergency call.

(Operation of Mobile Communication System According to First Embodiment of the Present Invention)

Figure 7:
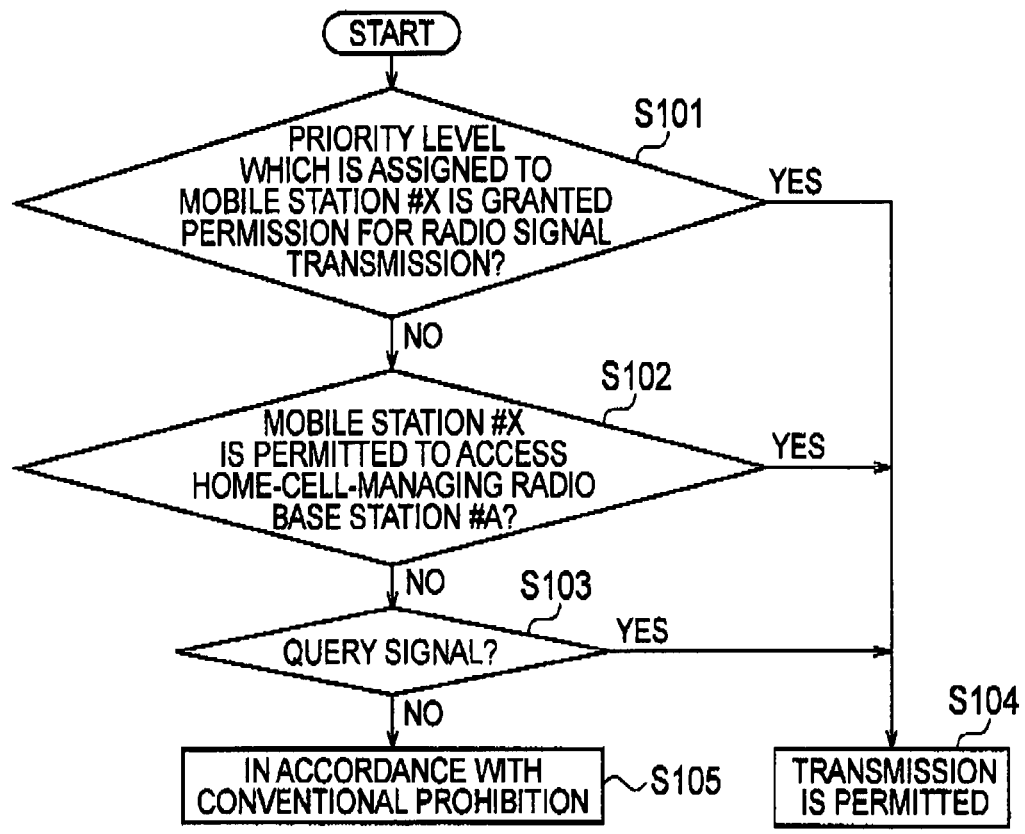
FIG. 7 is a flowchart showing an operation of the mobile station according to the first embodiment of the present invention.
Figure 8:
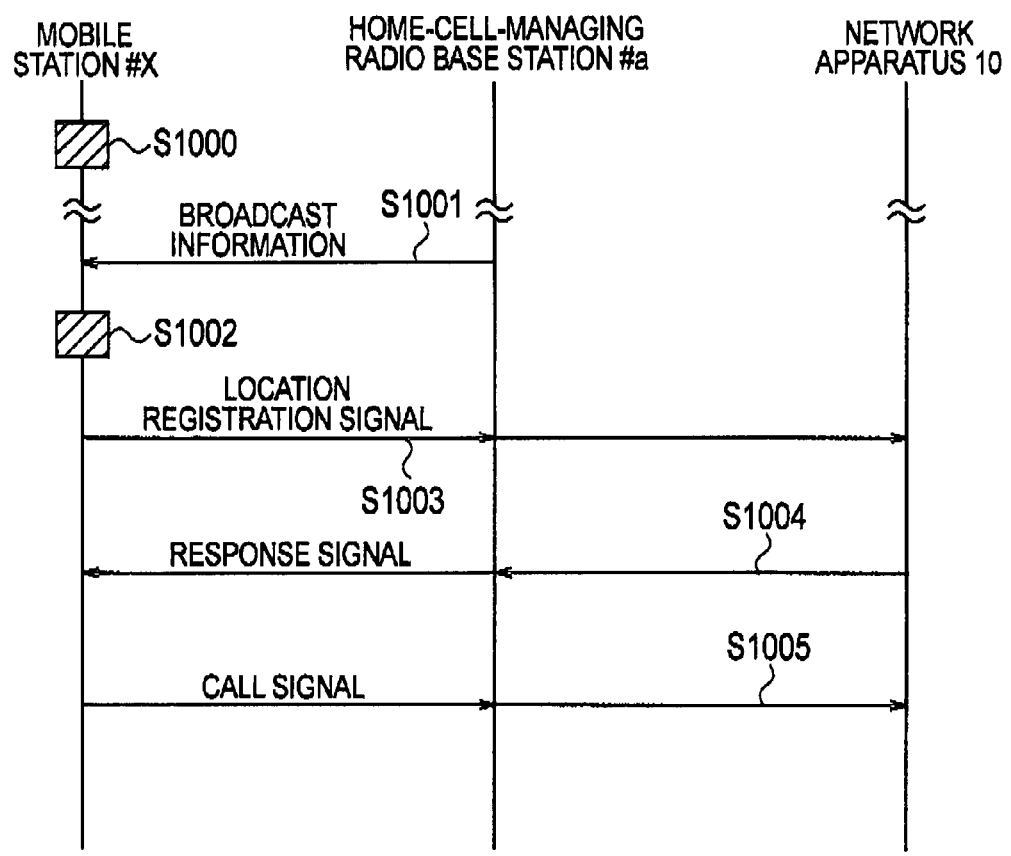
FIG. 8 is a sequence diagram showing an operation of the mobile communication system according to the first embodiment of the present invention.
Figure 9:
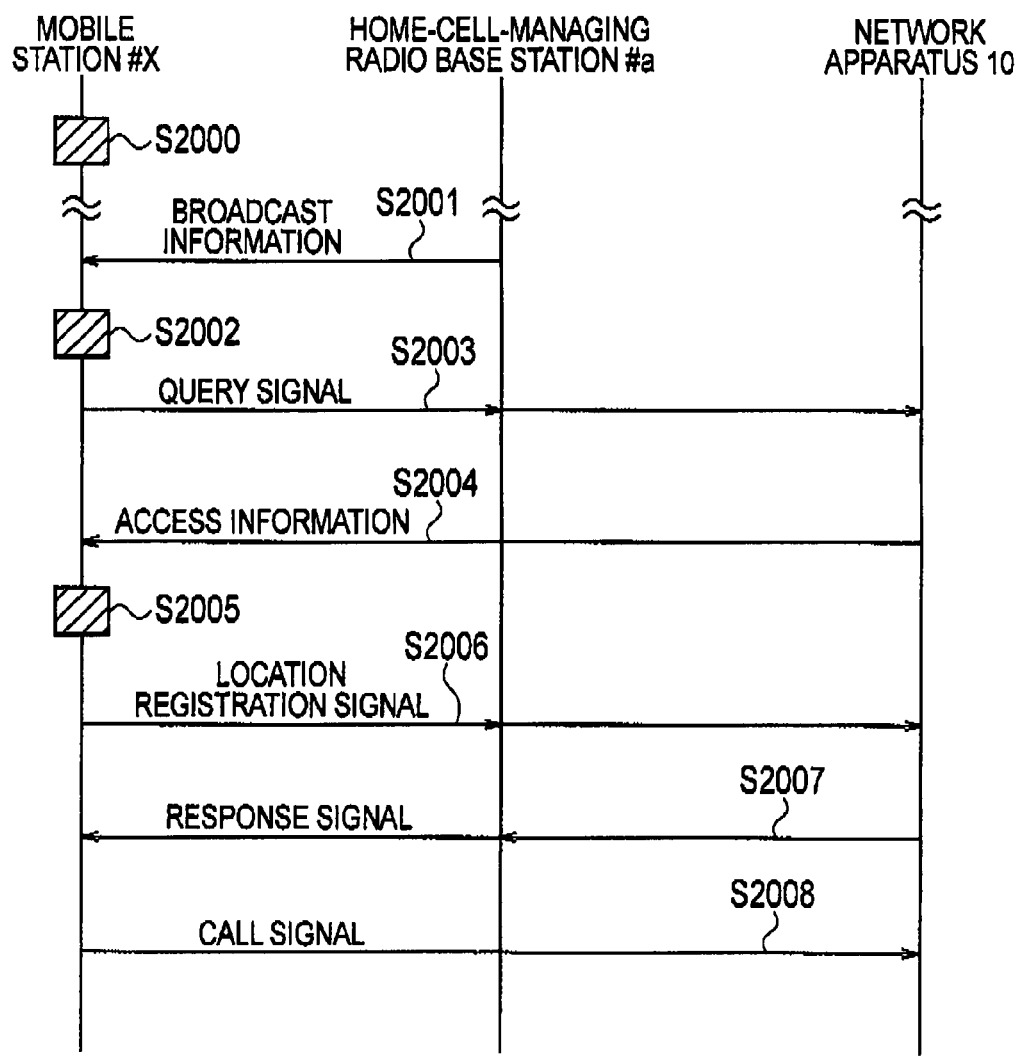
FIG. 9 is a sequence diagram showing an operation of the mobile communication system according to the first embodiment of the present invention.

Referring to FIG. 7 through FIG. 9, an operation of the mobile communication system according to the first embodiment of the present invention will be described.

Firstly, referring to FIG. 7, an operation of the mobile station #X according to this embodiment will be described.

As shown in FIG. 7, in Step S101, the mobile station #X determines whether or not the transmission availability information included in the broadcast information received in the home cell #a indicates that the priority level which is assigned to the mobile station #X is granted permission for radio signal transmission.

When having determined that the permission is granted, the mobile station #X transmits a radio signal, such as a location registration signal or a call signal, to the home-cell-managing radio base station #a in Step S104.

On the other hand, when having determined that the permission is not granted, referring to access information managing unit 31, the mobile station #X determines whether or not the mobile station #X is permitted to access the home-cell-managing radio base station #a in Step S102.

When having determined that the permission is granted, the mobile station #X transmits a radio signal, such as a location registration signal or a call signal, to the home-cell-managing radio base station #a in Step S104.

On the other hand, when having determined that the permission is not granted, referring to access information managing unit 31, the mobile station #X determines whether or not a radio signal to be transmitted is a query signal in Step S103.

When having determined that the radio signal to be transmitted is a query signal, the mobile station #X transmits the query signal to the home-cell-managing radio base station #a in Step S104.

On the other hand, when having determined that the radio signal to be transmitted is not a query signal, the mobile station #X determines whether or not the mobile station #X is permitted to transmit a radio signal, such as a location registration signal or a call signal, to the home-cell-managing radio base station #a in accordance with a conventional prohibition in Step S105.

Here, in this embodiment, the mobile station #X determines that the mobile station #X is not permitted to transmit a radio signal, such as a location registration signal or a call signal, to the home-cell-managing radio base station #a in Step S105.

Secondly, referring to FIG. 8, an operation of mobile station #X in the mobile communication system according to the embodiment when the mobile station #X manages access information to the home-cell-managing radio base station #a will be described.

As shown in FIG. 8, in Step S1000, a distributor shop of a mobile communication carrier sets access information to a USIM mounted on the mobile station #X, the access information specifying a home-cell-managing radio base station which permits access from the mobile station #X.

Here, it is assumed that the access information includes the home-cell-managing radio base station #a as the home-cell-managing radio base station which permits access from the mobile station #X.

In Step S1001, the mobile station #X receives broadcast information transmitted by the home-cell-managing radio base station #a. Here, it is assumed that the broadcast information includes outgoing call availability information restricting radio signal transmission by all the mobile stations, radio signal transmission by all the priority levels of the mobile stations, or radio signal transmission for all the call types.

The mobile station #X determines in Step S1002 that an access to the home-cell-managing radio base station #a is permitted in the access information, although the mobile station #X is prohibited from transmitting a radio signal to the home-cell-managing radio base station #a by transmission availability information included in the broadcast information received by the broadcast information receiving unit 33. Then in Step S1003, the mobile station #X transmits a location registration signal to the network apparatus 10 via the home-cell-managing radio base station #a.

In Step S1004, the mobile station #X receives a response signal to the location registration signal from the network apparatus 10 via the home-cell-managing radio base station #a. Then in Step S1005, the mobile station #X transmits a call signal to the network apparatus 10 via the home-cell-managing radio base station #a.

Thirdly, referring to FIG. 9, an operation of mobile station #X in the mobile communication system according to the embodiment when the mobile station #X manages access information to the home-cell-managing radio base station #a will be described.

As shown in FIG. 9, in Step S2000, a distributor shop of a mobile communication carrier sets access information to a USIM mounted on the mobile station #X, the access information specifying a home-cell-managing radio base station which permits access from the mobile station #X.

Here, it is assumed that the access information includes no home-cell-managing radio base station #a as the home-cell-managing radio base station which permits access from the mobile station #X.

In Step S2001, the mobile station #X receives broadcast information transmitted by the home-cell-managing radio base station #a. Here, it is assumed that the broadcast information includes outgoing call availability information restricting radio signal transmission by all the mobile stations, radio signal transmission by all the priority levels of the mobile stations, or radio signal transmission for all the call types.

In Step S2002, the mobile station #X determines that the home-cell-managing radio base station #a is not included as the home-cell-managing radio base station which permits access from the mobile station #X. Then in Step S2003, the mobile station #X transmits a query signal to the network apparatus 10 via the home-cell-managing radio base station #a, the query signal used to inquire whether or not the mobile station #X is permitted to access the home-cell-managing radio base station #a.

In Step S2004, the mobile station #X receives access information from the network apparatus 10 via the home-cell-managing radio base station #a, the access information indicating whether or not the mobile station #X is permitted to access the home-cell-managing radio base station #a.

Here, it is assumed that the access information indicates that the mobile station #X is permitted to access the home-cell-managing radio base station #a.

The mobile station #X determines in Step S2005 that access to the home-cell-managing radio base station #a is permitted in the access information, although the mobile station #X is prohibited from transmitting a radio signal to the home-cell-managing radio base station #a by transmission availability information included in the broadcast information received by the broadcast information receiving unit 33. Then in Step S2006, the mobile station #X transmits a location registration signal to the network apparatus 10 via the home-cell-managing radio base station #a.

In Step S2007, the mobile station #X receives a response signal to the location registration signal from the network apparatus 10 via the home-cell-managing radio base station #a. Then in Step S2008, the mobile station #X transmits a call signal to the network apparatus 10 via the home-cell-managing radio base station #a.

(Advantageous Effect of Mobile Communication System According to First Embodiment of the Present Invention)

In the mobile communication system according to the first embodiment of the present invention, the mobile stations #X and #Y are each configured to be permitted to transmit a radio signal irrespective of the transmission availability information included in the broadcast information transmitted by a home-cell-managing radio base station in a case where the access to the home-cell-managing radio base station is permitted in the access information managed by the access information managing unit 31. Meanwhile, the mobile stations #X and #Y are each configured to determine whether or not radio signal transmission is permitted on the basis of the transmission availability information included in the broadcast information transmitted by the home-cell-managing radio base station in a case where the access to the home-cell-managing radio base station is not permitted in the access information managed by the access information managing unit 31.

For this reason, in a home cell which is under control of a home-cell-managing radio base station provided in an area along a heavy traffic road, in a high-density residential area, or in any other area, it is possible to make such a setting that only an unregistered mobile station is not permitted to transmit a radio signal, and thus to prevent an excessive increase in processing load on the home-cell-managing radio base station.

Modification Example 1

The above embodiment is described taking a mobile communication system of W-CDMA scheme as an example. However, the present invention is not limited to the above mobile communication system, but is also applicable to a mobile communication system of an LTE (Long Term Evolution) scheme, for example.

In such a case, at least one of the radio base station eNB and the exchange MME is equipped with the functions of the above-mentioned network apparatus 10. In other words, in a mobile communication system according to the modification example 1, at least one of the radio base station eNB and the exchange MME is configured to function as the above-mentioned network apparatus 10.

Modification Example 2

Figure 10:
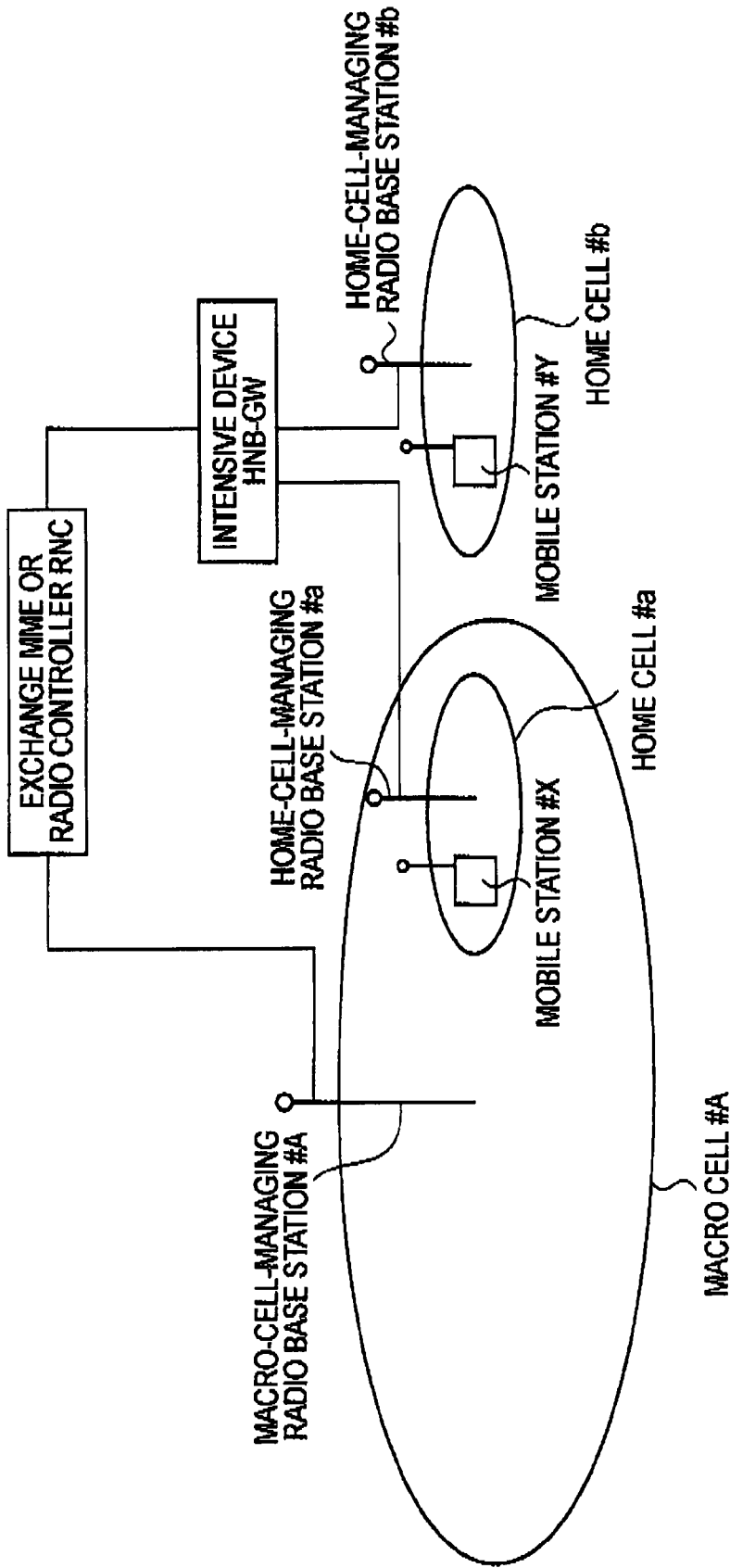
FIG. 10 is an entire configuration diagram of a mobile communication system according to a second embodiment of the present invention.

Referring to FIG. 10, a mobile communication system according to a modification example 2 of the present invention will be described. Hereinbelow, the mobile communication system according to the modification example 2 of the present invention will be described focusing on differences with the mobile communication system according to the first embodiment described above.

As shown in FIG. 10, the mobile communication system according to the modification example 2 of the present invention may be a mobile communication system of the W-CDMA scheme, or a mobile communication system of the LTE scheme.

In addition, in the mobile communication system according to the modification example 2 of the present invention, a macro-cell-managing radio base station #A is connected to an exchange MME or a radio controller RNC while a home-cell-managing radio base stations #a and #b are each connected to an intensive device HNB-GW and to either the exchange MME or the radio controller RNC.

In a case where the mobile communication system according to the modification example 2 of the present invention is a mobile communication system of the W-CDMA scheme, at least one of the radio base station NodeB, the radio controller RNC, and the intensive device HNB-GW is equipped with the functions of the above-mentioned network apparatus 10. In other words, in the mobile communication system according to the modification example 2, at least one of the radio base station NodeB, the radio controller RNC, and the intensive device HNB-GW is configured to function as the above-described network apparatus 10.

Alternatively, in a case where the mobile communication system according to the modification example 2 of the present invention is a mobile communication system of the LTE scheme, at least one of the exchange MME, the radio base station eNB, and the intensive device HNB-GW is equipped with the functions of the above-mentioned network apparatus 10. In other words, in the mobile communication system according to the modification example 2, at least one of the exchange MME, the radio base station eNB, and the intensive device HNB-GW is configured to function as the above-mentioned network apparatus 10.

Modification Example 3

Hereinbelow, the mobile communication system according to the modification example 2 of the present invention will be described focusing on the differences with the mobile communication system according to the first embodiment described above.

In a mobile communication system according to a modification example 3 of the present invention, the above-mentioned transmission availability information may be a signal which indicates whether or not radio signal transmission to a cell under control of a radio base station is permitted.

In this respect, a mobile station UE is permitted to transmit a radio signal to a first cell which is under control of a first radio base station when having determined that accesses to the first cell is permitted during processing of determining whether or not radio signal transmission is needed on the basis of access information (broadcast information from a radio base station, or the like) broadcast by a network, or on the basis of access information managed inside the mobile station UE, even in a case where radio signal transmission to the first cell under control of the first radio base station is prohibited in the received transmission availability information. Meanwhile, in a case where the mobile station UE determines that the access to the first cell is not permitted but access to a second cell is permitted (in a case where access to a second cell which is under control of the first radio base station is not prohibited), the mobile station UE is permitted to transmit a radio signal to the first radio base station (the second cell under control of the first radio base station) even in a case where the same frequency is used in the second cell as the one in the first cell.

Note that operation of the above described mobile station, home-cell-managing radio base station and network apparatus 10 may be implemented by means of hardware, a software module executed by a processor, or a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station, home-cell-managing radio base station and network apparatus 10. Also, the storage medium and the processor may be provided in the mobile station, home-cell-managing radio base station and network apparatus 10 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of transmitting from a first radio base station broadcast information including transmission availability information indicating whether or not radio signal transmission to the first radio base station is permitted; and
   step B of determining at a mobile station whether or not radio signal transmission to the first radio base station is permitted on the basis of the transmission availability information included in the broadcast information and access information managed inside the mobile station that identifies a radio base station and indicates whether or not the mobile station is permitted to access the radio base station, wherein
   in the step B, the mobile station is permitted to transmit a radio signal to the first radio base station in a case where access to the first radio base station is permitted in the access information even when radio signal transmission to the first radio base station is prohibited in the transmission availability information;
   wherein the broadcast information includes transmission availability information indicating that radio signal transmission to the first radio base station for all call types and signal types, including emergency calls, page response signals and location signals, is not permitted.

2. The mobile communication method according to claim 1, wherein
   in the step A, the first radio base station transmits broadcast information including transmission availability information restricting radio signal transmission by all of mobile stations, radio signal transmission by all of priority levels of the mobile stations, or radio signal transmission for all of call types.

3. The mobile communication method according to claim 1, comprising the steps of:
   transmitting a query signal by the mobile station irrespective of the transmission availability information included in the received broadcast information, the query signal inquiring access information for the mobile station to access the first radio base station; and
   acquiring access information by the first radio base station from a network apparatus in response to the query signal, and notifying the mobile station of the access information for the mobile station to access the first radio base station.

4. A mobile station comprising:
   circuitry configured to
     receive broadcast information from a first radio base station, the broadcast information including transmission availability information indicating whether or not radio signal transmission to the first radio base station is permitted;
     manage access information that identifies a radio base station and indicates whether or not the mobile station is permitted to access the radio base station; and
     determine whether or not radio signal transmission to the first radio base station is permitted on the basis of the transmission availability information included in the broadcast information and of the access information, wherein
   the circuitry is configured to determine that transmission of a radio signal to the first radio base station is permitted in a case where access to the first radio base station is permitted in the access information even when radio signal transmission to the first radio base station is prohibited in the transmission availability information;
   wherein the broadcast information includes transmission availability information indicating that radio signal transmission to the first radio base station for all call types and signal types, including emergency calls, page response signals and location signals, is not permitted.

5. The mobile station according to claim 4, wherein the broadcast information includes outgoing call availability information restricting radio signal transmission by all of mobile stations, radio signal transmission by all of priority levels of the mobile stations, or radio signal transmission for all of call types.

6. The mobile station according to claim 4, wherein the circuitry is further configured to acquire access information for the mobile station to access the first radio base station, by controlling transmission of a query signal to the first radio base station irrespective of the transmission availability information included in the received broadcast information.

* * * * *